May 24, 1966
T. P. PAJAK ETAL
3,252,548
SHOCK ABSORBER CARTRIDGE
Filed May 31, 1963
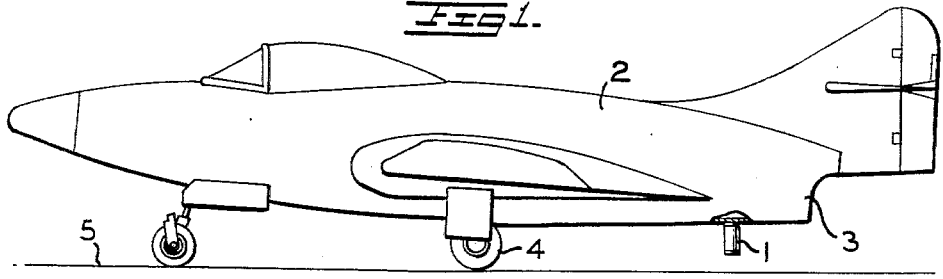
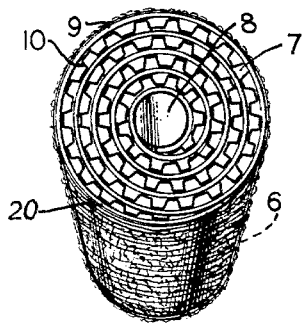
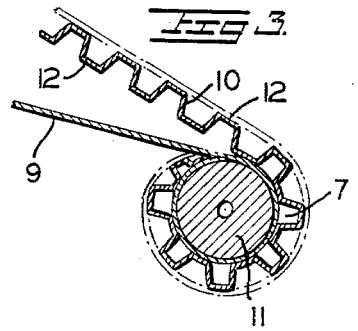
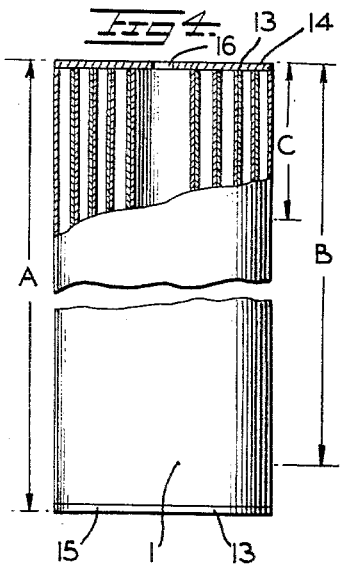
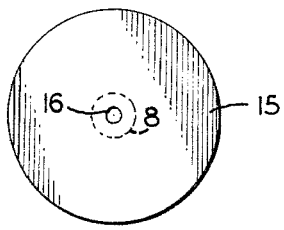
INVENTORS
THEODORE PETER PAJAK
EDWARD WESLEY BARSAM
BISHOP JOSEPH MOLL
BY
*Fidelman & Wolffe*
ATTORNEYS though this specific application is described, it will be apparent that the shock absorber of this invention is useful in a wide variety of other applications.

United States Patent Office
3,252,548
Patented May 24, 1966

3,252,548
SHOCK ABSORBER CARTRIDGE
Theodore Peter Pajak, Bel Air, Md., and Edward Wesley Barsam, 453 Commerce St., and Bishop J. Moll, Box 230, both of Havre De Grace, Md.
Filed May 31, 1963, Ser. No. 284,526
4 Claims. (Cl. 188—1)

The present invention relates to shock absorbers. More particularly, the invention relates to a shock absorber wherein kinetic energy is absorbed by the deformation of a ductile material such as aluminum beyond its elastic limit.

The shock absorber of the present invention is especially designed and adapted to protect the tail end of an aircraft from damage should the plane unexpectedly pivot backwardly about its main landing gear during landing or takeoff. Not only must the shock absorber employed for this purpose be light in weight, but for this specific application it is desirable that the shock absorber eliminate any rebound or bounce.

Suggestions have been made to employ for shock absorbing purposes the high strength light-weight material known as honeycomb.

Conventionally, honeycomb structures are formed by stacking, face to face and suitably bonding, corrugated sheets (usually paper or aluminum sheet) to directly form a block of honeycomb. Alternatively, blocks of honeycomb have been formed by placing parallel adhesive lines at spaced apart intervals on planar sheets, stacking the sheets together with the adhesive lines on each side in alternation, and then after the adhesive has been cured, drawing the sheets apart to form the individual sheets into the typical hexagonal cell honeycomb.

It is known that when a crushing load is applied substantially parallel to the cell axes of a block of honeycomb formed of ductile material, the block will absorb energy by the deformation of the ductile material beyond its elastic limit without rebound.

However, for shock absorbing purposes and particularly in instances where a cylindrically shaped shock absorber is desired, the above described conventional honeycomb structures have certain disadvantageous characteristics. Specifically, a honeycomb block, having for instance the conventional hexagonal shaped open cell structure, exhibits a generator crushed strength in one plane parallel to the axis of the open cell structure than in a plane at right angles thereto. Consequently, a cylindrical shock absorber formed of conventional honeycomb exhibits a tendency toward buckling because of this differential strength characteristic. Another disadvantage of employing conventional honeycomb block to form cylindrical shock absorbing members is the waste and added expense involved in trimming the cylinder from the base block of honeycomb.

It has been found that a cylindrically shaped, open cell shock absorber cartridge formed of spirally wrapped plain and corrugated sheets of ductile material, such as aluminum, is particularly suitable to fill the requirements of a light cylindrical shock absorber.

Accordingly, the principal object of the present invention is to form a shock absorber cartridge having an improved open cell structure whose crushing characteristics are most favorable to efficient deceleration.

Further, it is an object of the present invention to provide a cylindrical shaped shock absorber cartridge which is adapted to be quickly installed or removed from a point of use.

A preferred embodiment of the present shock absorbing structure is illustrated in the accompanying drawings wherein:

FIG. 1 diagrammatically illustrates the placement of the shock absorber of the present invention on an aircraft;

FIG. 2 is a perspective view showing the open cell structure of the crushable member employed in the assembly of the present shock absorber;

FIG. 3 is a diagrammatic view showing the manner in which the open cell structure is fabricated;

FIG. 4 is a side view, partly broken away, showing how a load bearing disc may be mounted on each of the crushable member; and FIG. 5 is an end view of the unit seen in FIG. 4.

As shown in FIGURE 1, the shock absorber cartridge of the present invention, generally designated as 1, is adapted to be affixed in any suitable manner to the bottom of the fuselage toward the rear of airplane 2 in order to absorb shock in the event that the tail end 3 of the airplane would pivot backwardly about the main landing gear 4, while the airplane is in contact with runway 5. Such contact of the tail portion of the aircraft could occur either on takeoff or landing.

Referring now to FIGURE 2, it may be seen that the crushable member 6 forming part of cartridge 1 is in the form of a spirally wound open cell cylindrical structure having a plurality of individual cells 7 extending through member 6 each generally parallel to a central cylindrical opening 8.

As illustrated in FIGURE 3, crushable member 6 is formed from a smooth flat sheet 9 and a corrugated sheet 10 laid together and wrapped under tension around a removable mandrel 11 of any desired diameter. Suitably both sheets 9 and 10 are formed of aluminum.

In the preferred embodiment of cartridge 1, a thermosetting adhesive, e.g., an epoxy adhesive, is placed on the upstanding portions 12 of the corrugated sheet 10, prior to or during the winding of the sheets 9 and 10 on mandrel 11 in order to bond the sheets together.

After the removal of member 6 from the mandrel 11, member 6 is axially pre-crushed to an extend sufficient to increase the area of the end surfaces 13 of sheets 9 and 10. Thereafter, as seen in FIG. 4, flat metallic load distributing discs 14 and 15, preferably also of aluminum, are fixed to the ends of member 6 by any suitable means, e.g. by a thermosetting epoxy adhesive. Discs 14 and 15 are provided with centrally positioned holes 16, which permit passage of a mounting bolt (not shown), for attachment of cartridge 1 to airplane 2.

The thus-formed cartridge structure, having an overall length A, is then heated to cure the adhesive and firmly bond the sheets to each other and the sheet ends to the discs, respectively. The final step of fabricating the shock absorber cartridge of the present invention involves the axial crushing of cartridge 1 to a final length B in a suitable load test machine to determine the crushing characteristics of the cartridge.

It has been found that by pre-stressing member 6 to slightly beyond its elastic limit during the step of enlarging its end surfaces, the shock absorber cartridge of the present invention will sustain a constant stress loading to a point of failure. Letter C represents the length of the shock absorber cartridge (about 38% of the original length) whereafter it will no longer absorb energy at a constant rate.

In an alternative embodiment of the present shock absorber cartridge (not shown) the thermosetting adhesive employed to adhesively bond sheets 9 and 10 may be omitted. Also, if desired, a tape formed of unidirectional fiberglass 20 (shown only in FIGURE 2) may be wrapped around member 6 to both prevent unwinding of sheets 9 and 10 and to insure against diameter changes of member 6 during crushing use of the cartridge.

As an instance of the preferred embodiment of the present invention, the crushable member 6 was formed by winding under tension a 0.003" plane alumum sheet and a 0.003" corrugated aluminum sheet having 0.10" cell depth about a 0.50" diameter mandrel. The paired sheets were wound to an outside diameter of about 3.5" forming a cylindrical structure having this diameter and a length of approximately 16.4". A suitable thermosetting epoxy cement (exemplarily BR–90 adhesive produced by Bloomingdale Rubber Company) was applied to the up-standing portions of the corrugated sheet prior to winding the paired sheets on the mandrel. The structure was then axially pre-crushed to approximately 16.2" in order to increase the area of the ends of the spirally wound sheets and a pair of .032" flat discs formed of aluminum (such as Alclad) or steel or both were affixed to the ends of the structure (by BR–90 adhesive). The completed structure was then heated in order to effect curing of the adhesive. After cooling, the now completed cartridge was axially pre-crushed to a final overall length of approximately 16" and with an outside diameter of approximately 3.65" in order to determine the crushing characteristics.

Upon subjecting the finished cartridge to further loading under controlled static and dynamic loading conditions, it was determined that the cartridge would sustain a load of approximately 15,000 lbs. and undergo compression at a constant rate until its length had been reduced to approximately 6". During compression under operating conditions the outside and inside diameters of the cartridge remained reasonably constant and there was a uniform collapse of the crushable member along the cylinder axis with no splitting or tearing of the individual sheets.

A comparison was made between the shock absorber cartridge of the present invention and one trimmed from a block of conventional hexagonal core honeycomb material. The hexagonal honeycomb was formed using like materials and sheet thicknesses. It was determined that the spirally wound crushable member of the present invention was approximately 30 times more resistant to splitting than the cylinder formed of conventional honeycomb, and that there was a tendency for the cylinder formed of conventional honeycomb to buckle under loading due to non-uniform strength characteristics of the conventional honeycomb.

The shock absorbing cartridge of the present invention may be installed where desired by conventional means such as a mounting bolt (not shown) slidably passing through cylindrical opening 8 and holes 16 in discs 14 and 15, which bolt is suitably affixed to a mounting plate or disc (not shown) disposed in a juxtaposed position to and biased towards one of the discs 14 or 15. Alternatively, the cartridge may be slidably positioned partially within an open cylindrical housing (not shown) having therein a seat for one of the load distributing discs 14 or 15. The ability of the shock absorbing cartridge of the present invention to resist lateral deformation and buckling under shock absorbing conditions permits the cartridge to be easily removed from the mounting bolt or from within the cylindrical housing.

From the foregoing description it will be apparent that an improved shock absorber cartridge and method of making such structure has been provided. It will, no doubt, be apparent to those skilled in the art that various changes may be made in the particular form disclosed, and that other forms are possible, all within the spirit of the present invention. Exemplary of such a contemplated change is construction crushable member 6 in the form of a frustrum of a cone, while maintaining a central opening 8 of constant diameter. This construction provides a shock absorber with non-linear decelerating or crushing characteristics. To form a crushable member 6 in this form, sheets 9 and 10 may be present on a bias prior to winding upon mandrel 11 or left rectangular and wound on a bias. Hence, it is desired that the foregoing be taken as illustrative and within the scope of the hereinafter appended claims.

What is claimed is:
1. A shock absorber in the form of an axially elongated cylinder comprising a spirally wound plane sheet of ductile metal, a spirally wound corrugated sheet of ductile metal, the convolutions of said sheets being in an alternately spaced abutting relations and acting to define a plurality of cells extending axially of said shock absorber, and a pair of flat metallic discs, one adhesively bonded to each end of said cylinder.
2. The shock absorber of claim 1 in which said corrugated sheet is formed with alternately spaced outwardly and inwardly facing surface portions, said portions being adhesively bonded to said plane sheet.
3. The shock absorber of claim 1 wherein the outer cylindrical surface of said cylinder is wrapped with fiberglass filament.
4. The shock absorber of claim 2 wherein the end portions are axially pre-crushed to exceed the elastic limit of the composite structure formed by said sheets and the discs are adhered to the flattened ends.

References Cited by the Examiner
UNITED STATES PATENTS

| | | | |
|---|---|---|---|
| 2,878,560 | 3/1959 | Geir | 29—455 |
| 2,962,811 | 12/1960 | Herbert | 29—455 |
| 3,010,540 | 11/1961 | Dahlen | 188—1 |
| 3,082,846 | 3/1963 | Jensen et al. | 188—1 |
| 3,130,819 | 4/1964 | Marshall | 188—1 |

FOREIGN PATENTS 9,228   9/1911   Great Britain.

MILTON BUCHLER, *Primary Examiner.*
DUANE A. REGER, *Assistant Examiner.*